US012584530B2

(12) United States Patent
Skorski et al.

(10) Patent No.: US 12,584,530 B2
(45) Date of Patent: Mar. 24, 2026

(54) ELECTROMAGNETIC BRAKE

(71) Applicant: KONECRANES GLOBAL CORPORATION, Hyvinkää (FI)

(72) Inventors: Richard Skorski, Uslar (DE); Harald Engel, Uslar (DE); Thomas Kröpke, Wetter (DE)

(73) Assignee: Konecranes Global Corporation, Hyvinkää (FI)

( * ) Notice: Subject to any disclaimer, the term of this patent is extended or adjusted under 35 U.S.C. 154(b) by 303 days.

(21) Appl. No.: 17/597,801

(22) PCT Filed: Jul. 20, 2020

(86) PCT No.: PCT/EP2020/070401
§ 371 (c)(1),
(2) Date: Jan. 24, 2022

(87) PCT Pub. No.: WO2021/013778
PCT Pub. Date: Jan. 28, 2021

(65) Prior Publication Data
US 2022/0275844 A1     Sep. 1, 2022

(30) Foreign Application Priority Data

Jul. 24, 2019     (DE) ..................... 10 2019 120 042.3

(51) Int. Cl.
*B66D 5/30*          (2006.01)
*B66D 5/14*          (2006.01)
(Continued)

(52) U.S. Cl.
CPC ............. *F16D 65/186* (2013.01); *B66D 5/14* (2013.01); *B66D 5/30* (2013.01);
(Continued)

(58) Field of Classification Search
CPC ...................................................... F16D 65/186
See application file for complete search history.

(56) References Cited

U.S. PATENT DOCUMENTS 3,763,968 A      10/1973  Noly
10,288,133 B1 *  5/2019   Godinsky ............... F16D 55/22
(Continued)

FOREIGN PATENT DOCUMENTS

CN          105970896 A  *  9/2016  ......... E02B 17/0818
CN          208295010 U     12/2018
(Continued)

OTHER PUBLICATIONS

Preliminary Report on Patentability of the International Searching Authority in English from corresponding Patent Cooperation Treaty (PCT) Application No. PCT/EP2020/070401, completed Jun. 10, 2021.

*Primary Examiner* — Melody M Burch
(74) *Attorney, Agent, or Firm* — Gardner, Linn, Burkhart & Ondersma LLP

(57) ABSTRACT
An electromagnetic brake with a housing body and a coil unit, wherein the coil unit has a positive connection to the housing body, wherein the coil unit is positively connected to the housing body by means of a snap-fit connection, wherein at least one snap hook of the coil unit is supported on a web of the housing body.

19 Claims, 14 Drawing Sheets

BEST AVAILABLE IMAGE

Figure 1:
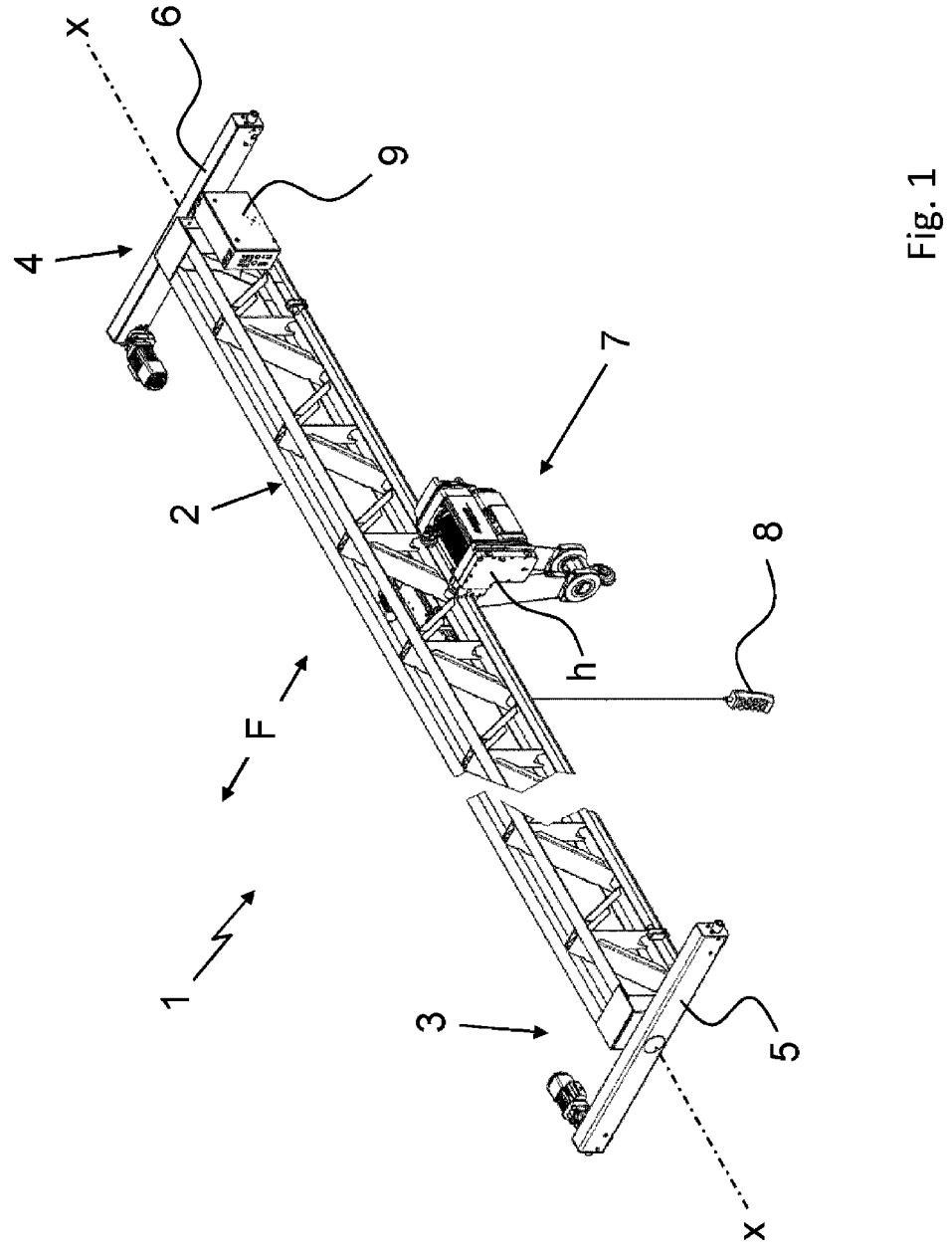

(51) Int. Cl.

| | |
|---|---|
| *F16D 65/18* | (2006.01) |
| *F16D 55/00* | (2006.01) |
| *F16D 55/22* | (2006.01) |
| *F16D 59/00* | (2006.01) |
| *F16D 121/22* | (2012.01) |

(52) U.S. Cl.
CPC ...... *F16D 2055/0058* (2013.01); *F16D 55/22* (2013.01); *F16D 59/00* (2013.01); *F16D 2121/22* (2013.01); *F16D 2250/0084* (2013.01)

(56) References Cited

U.S. PATENT DOCUMENTS

| | | | |
|---|---|---|---|
| 2009/0260927 A1 | 10/2009 | Qu et al. | |
| 2013/0192934 A1* | 8/2013 | Knop | F16D 55/28 |
| | | | 188/72.3 |
| 2018/0058522 A1* | 3/2018 | Ono | F16D 63/002 |
| 2018/0323520 A1* | 11/2018 | Tsau | H01R 9/0521 |
| 2022/0243775 A1 | 8/2022 | Skorski et al. | |

FOREIGN PATENT DOCUMENTS

| | | | |
|---|---|---|---|
| CN | 109494327 A | | 3/2019 |
| DE | 28 32 723 C2 | | 5/1990 |
| DE | 41 09 786 A1 | | 10/1991 |
| DE | 19752543 A1 | | 6/1999 |
| DE | 100 49 168 C2 | | 12/2003 |
| DE | 19838171 B4 | | 4/2006 |
| DE | 10 2012 001 701 B3 | | 3/2013 |
| DE | 10 2014 001 474 B4 | | 8/2014 |
| DE | 102017000845 A1 | | 8/2018 |
| EP | 2006563 A1 | | 12/2008 |
| FR | 2660381 A1 | * | 10/1991 |
| JP | S5221387 U | | 2/1977 |
| JP | S56149134 U | | 11/1981 |
| JP | H05256330 A | | 10/1993 |
| JP | 2022542541 A | | 10/2022 |
| KR | 101299558 B1 | | 8/2013 |
| WO | 2018141480 A1 | | 8/2018 |

* cited by examiner

BEST AVAILABLE IMAGE

ELECTROMAGNETIC BRAKE

The invention relates to an electromagnetic brake according to the preamble of claim 1. Further, the invention relates to a method for assembling such an electromagnetic brake according to the preamble of claim 8.

Such an electromagnetic brake is known from DE 10 2017 000 845 A1 and from JP H05 256 330 A. In JP H05 256 330 A, the coil unit is connected to the housing body by means of an injected and subsequently cured impregnation material. The housing body also has on its inner wall a projection, which holds the composite of the cured impregnation material and the coil unit in the housing body.

Further electromagnetic brakes are known from DE 10 2012 001 701 B3, DE 41 09 786 A1, DE 10 2014 001 474 B4, DE 100 49 168 C2 or DE 28 32 723 C2 and KR 101-299-558 Bl.

Proceeding from this prior art, the object of the present invention is to create an improved electromagnetic brake that can be mounted in a particularly simple manner.

This object is achieved by an electromagnetic brake having the features of claim 1 and a method according to the features of claim 8. Advantageous embodiments of the invention are specified in the dependent claims and the following description.

According to the invention, an improved electromagnetic brake with a housing body and a coil unit is provided, wherein the coil unit has a preferably exclusive, positive connection to the housing body in that the coil unit is positively connected to the housing body by means of a snap-fit connection, wherein at least one snap hook of the coil unit is supported on a web of the housing body.

The snap hook is in each case dimensioned and designed in terms of material technology in such a way that, when the coil unit is mounted in the housing body, it can be elastically deformed by applying a force, such that the snap hook can latch into a groove provided on the housing body. In this case, the force acts in particular parallel to a central axis of the housing body in the direction of the base of the housing body.

In contrast to the prior art, according to which, for example, the coil unit is molded into the housing body by means of synthetic resin, the assembly can thus be simplified in the electromagnetic brake according to the invention in such a way that the electromagnetic brake can be mounted more easily in a partially automated or fully automated manner. These advantages also result with respect to a non-positive connection. This enables simple mounting in a manufacturing operation, which is designed in the spirit of industry 4.0, in particular with the aid of robots.

The housing body has a substantially hollow cylindrical and annular shape with an opening on its end face and a base opposite the end face. The housing body is preferably formed in one piece. The material of the housing body is selected such that its stiffness is sufficient for the forces occurring during one or more braking(s) and its temperature resistance sufficient for the temperatures occurring during one or more braking(s). In addition, the material of the housing body is preferably magnetic.

The coil unit preferably has a substantially annular geometry with an outwardly directed open C-shaped cross section. The coil unit is designed as a coil carrier and is suitable for receiving one or more coils or for mounting them on itself or in itself.

Due to its substantially annular geometry, the coil unit preferably has at least three snap hooks. A different number of snap hooks is of course also conceivable, wherein said number is preferably determined taking into account the forces occurring.

The snap hook or hooks may be an integral component of the coil unit. However, it is also conceivable for the snap hooks to be connected to separate components and to the coil unit.

In an advantageous embodiment, it is provided that the coil unit is secured against rotation relative to the housing body. Preferably, a positioning lug arranged on the coil unit engages for this purpose in a corresponding similarly shaped, preferably identically shaped, receptacle on the housing body, in order to secure the coil unit against rotation relative to the housing body. However, it is also conceivable that a corresponding receptacle is arranged in the coil unit and a positioning lug corresponding thereto is arranged on or in the housing body.

It is also of particular advantage that the coil unit is mounted on the housing body in such a way that the coil unit is flexible at least in the region of its positive connection to the housing body and is thus axially movable relative thereto in order to simplify assembly. For this purpose, the coil unit may have a shoulder on its side facing the base of the housing body in order to achieve a flexibility of the coil unit at least outside the shoulder. Said shoulder is preferably arranged on a diameter of the substantially annular coil unit, which diameter is as far away as possible from the diameter of the coil unit on which the snap hooks are arranged. Outside of the shoulder, a space remains free between the coil unit and the base of the housing body, for example, in the region of the inner diameter on which the snap hooks are arranged. This space can be used as a type of spring travel, in order to be able to press the coil unit axially in the direction of the housing body due to its partial flexibility during mounting, so that the snap hooks can latch more easily into the groove of the housing body.

Apart from the housing body and the coil unit, the electromagnetic brake preferably comprises a pole core, which can be excited by the coil unit and is arranged within the coil unit, at least one compression spring, an armature disk, a brake disk and a friction disk. The coil unit, the pole core, the compression spring(s), the armature disk, the brake disk and the friction disk are preferably arranged in the housing body. Preferably, the coil unit, the armature disk, the brake disk and the friction disk or at least individual ones thereof are introduced into the housing body via the opening on the end face and connected to said housing body during assembly. This preferably also applies to the compression spring(s). The pole core may be a component of the housing body.

The materials of the pole core, the armature disk, the brake disk and the friction disk are selected such that their stiffness is sufficient for the forces occurring during one or more braking(s) and their temperature resistance sufficient for the temperatures occurring during one or more braking(s). The pole core is also made of a magnetic material so that it can be excited by the coil unit.

The brake disk is preferably arranged between the axially displaceable armature disk and the friction disk and is configured to be rotatably and axially displaceable. The at least one compression spring is arranged and configured such that, as a result of its compressive force, the armature disk is axially displaceable toward the brake disk. By contrast, the coil unit and the pole core are arranged and configured such that a tensile force can be generated by the pole core which is electromagnetically excited by means of the coil unit, by means of which tensile force the armature disk is axially displaceable away from the brake disk.

The brake disk can be connected to a shaft, in particular a drive shaft, in particular an output shaft of a motor. In this case, it may be necessary for the housing body, the coil unit, the pole core, the compression spring, the armature disk and the friction disk or at least individual ones thereof to be formed in a ring-shaped manner, in that they each have a hole or an opening, so that the shaft can be guided therethrough.

In a first operating state of the electromagnetic brake, the braking, the armature disk presses the brake disk against the friction disk by means of the compressive force of the at least one compression spring, in order to brake the brake disk by means of the braking torque arising between the brake disk and the friction disk and/or between the brake disk and the armature disk. The friction disk and/or the armature disk preferably has/have a suitably structured surface on its/their side facing the brake disk respectively, in order to ensure an optimal deceleration of the brake disk during braking.

In a second operating state of the electromagnetic brake, the release, the armature disk is arranged at a distance from the brake disk by means of a tensile force generated by the coil unit and the pole core, which is greater than the compressive force of the at least one compression spring, such that a free and thus unbraked rotation of the brake disk is made possible.

In an advantageous embodiment, it is provided that the armature disk is guided axially in the housing body via a groove-lug connection, wherein at least one guide groove, preferably three guide grooves, and at least one associated guide lug, preferably three associated guide lugs, are provided. In addition to the axial guidance, the guide groove of the groove-lug connection also has the function of restricting the rotatability of the armature disk in the peripheral direction, such that the rotatability is only permitted within the scope of the play required for the axial movements. The respective guide groove is preferably arranged in the housing body and in particular is formed in its casing wall. The casing wall is closed to the outside in the region of the groove-lug connection and thus in particular in the region of the guide groove, since the guide groove does not constitute a continuous hole of the casing wall, but rather a depression in the casing wall of the housing body. A continuous hole which can be penetrated completely by the guide lug is, in this sense, not a guide groove. It is also conceivable for the guide groove, in particular in the form of a recess, to be arranged in the armature disk and for a respectively corresponding lug-shaped contour in the housing body to be arranged as a guide lug, wherein said contour is then preferably formed an integral component of the housing body and in particular in the casing wall thereof. In both aforementioned cases, the casing wall is closed outward in the region of the groove-lug connection. Better protection against environmental influences is achieved as a result. In addition, no moving elements, such as the guide lug, advantageously protrude out of the housing body, so that undesired collisions with other components can be avoided.

In order to enable the armature disk to be guided in the housing body without tilting, three guide grooves and three guide lugs are preferably provided. The guide grooves and guide lugs are preferably distributed uniformly over the circumference of the housing body or the armature disk. The outer contour of the guide lugs is embodied in a form similar or preferably identical to the inner contour of the guide grooves, wherein sufficient play for an axial movement of the armature disk is provided between the outer contour of the guide lugs and the inner contour of the guide grooves.

The armature disk is preferably guided axially in the housing body exclusively via the aforementioned groove-lug connection. Further guide elements, such as guide bolts or guide sleeves, are not required for guiding the armature disk in the housing body. These can thus be omitted and the outlay on construction and production can consequently be reduced. This is especially true when the guide elements would, for example, be non-positively fastened to the housing body with screws. In contrast to the prior art, the assembly can thus be simplified in such a way that the electromagnetic brake can be mounted more easily in a partially automated or fully automated manner. These advantages also ensue with respect to an integral connection.

Advantageously, the friction disk has a positive, preferably bayonet-type connection to the housing body and/or is secured against rotation relative to the housing body, wherein such a bayonet-type connection is referred to as a bayonet lock.

In other words, geometries corresponding to each other are provided on the housing body and on the friction disk, said geometries being embodied and configured such that the housing body and the friction disk can have a positive connection to one another by means of said geometries. A positive and in particular bayonet-type connection of this kind can arise in particular in that the housing body and the friction disk are initially plugged, set, placed, put or pushed into one another and thus brought into engagement with one another.

Preferred embodiments of the bayonet-type connection, also referred to as a bayonet invention lock, which is a preferred special form of the positive connection according to the invention, will be described in detail below.

The friction disk is designed as a substantially circular and preferably annular disk and has on its circumference at least one outwardly directed lug, by means of which the friction disk is mounted in the housing body in a positive and bayonet-type manner. At least two lugs are required in order to be able to prevent the friction disk from lifting out of the housing body. Preferably, the friction disk comprises three lugs, which are each arranged at an angle of 120° on the circumference of the friction disk. The friction disk is therefore preferably rotationally symmetrical, so that the lugs are distributed uniformly on the circumference of the friction disk. A different number of lugs is of course also conceivable.

In the region of the end face, the housing body has at least one recess with a receiving groove adjoining thereto. The recess is therefore arranged on the end face of the housing body on a web formed by the casing wall of the housing body and delimiting the receiving groove. The housing body has such a recess for each lug of the friction disk with a respective adjoining receiving groove, i.e. preferably three. A different number of recesses with receiving grooves adjoining thereto is of course also conceivable. The recesses are in each case introduced into the housing body at positions corresponding to the lugs. The recesses enable the friction disk or its lugs to be inserted into the receiving grooves and thus to produce the positive connection between the housing body and the friction disk. The receiving grooves preferably extend in sections circumferentially and spaced apart from one another in the casing wall of the housing body. Such an arrangement in sections of the receiving grooves has the advantage that the assembled position of the friction disk in the housing body can be pre-determined in a simple manner by the end of the receiving groove, which faces away from the recess and is in particular closed, and thus subsequent assembly steps can be simplified. As a result of their closed ends, the receiving grooves thus each define a bayonet seat, which facilitates the finding of the assembled position during assembly. Instead of a plurality of separate receiving grooves for the lugs of the friction disk, a single receiving groove extending over the entire circumference can alternatively also be provided.

For the production of the bayonet-type connection, the lugs of the friction disk are thus first guided through the recesses of the housing body. The contour of the lugs of the friction disk and the contour of the recesses in the housing body are coordinated with one another in such a way that the lugs fit through the recesses in the installed position with sufficient play. In a second step, the lugs of the friction disk are guided from the recess into the receiving grooves of the housing body and are displaced in the direction of rotation for this purpose. In this case, the friction disk and the housing body are typically rotated relative to one another for a bayonet lock. The material thickness of the lugs and the width of the receiving grooves are coordinated with one another in such a way that the lugs can be moved with sufficient play within the receiving groove in the direction of rotation.

Further elements are not required for the production of the connection between the friction disk and the housing body. In contrast to the prior art, in which the connection between the friction disk and the housing body or between the friction disk and other elements of the electromagnetic brake takes place in a non-positive manner, in particular by means of screws, the assembly can thus be simplified in such a way that the electromagnetic brake can be mounted more easily in a partially automated or fully automated manner. These advantages also ensue with respect to an integral connection.

During braking, the friction disk is pressed by means of the pressure force generated by the at least one compression spring via the armature disk and the brake disk onto the outer web of the casing wall of the housing body delimiting the receiving groove. During the release, the friction disk is pulled onto the inner web of the receiving groove by means of the magnetic field generated by the coil unit and the pole core or the resulting tensile force. In spite of a purely positive connection between the housing body and the friction disk produced during the mounting of the electromagnetic brake, the friction disk is thus pulled or pressed during operation by the acting forces against one of the webs delimiting the receiving groove of the housing body. Vibrations on the friction disk and thus noise generation during the operation of the electromagnetic brake can thus be reduced or even avoided.

The friction disk is secured against rotation relative to the housing body, in particular during operation of the electromagnetic brake. After the positive and in particular bayonet-type connection has been produced, the friction disk is prevented from being able to rotate, such that the connection between the friction disk and the housing body is at risk of disconnecting. In particular after its positioning in the receiving groove, the friction disk can thus no longer rotate out of the latter in the direction of the adjacent recesses, which could result in a release of the connection between the friction disk and the housing body when the lugs and recesses coincide. A correspondingly embodied contour is preferably provided in the friction disk, preferably in at least one of its lugs, for such an anti-rotation means, with which a locking element is then brought into engagement. The anti-rotation means can thus be produced by positive locking between the friction disk and the locking element.

Advantageously, the friction disk is secured against rotation relative to the housing body by means of at least one locking element, and the locking element is a connecting element that is used for the attachment of the electromagnetic brake to a component, for example for flanging on a motor or a cable drum. The locking element can be, for example, a pin or a screw, which then engages in the contour in the friction disk and thereby forms the positive anti-rotation means.

The locking element is preferably guided through a bore in the housing body and a recess forming the contour in one of the lugs of the friction disk. Neither the bore in the housing body nor the recess in the lug of the friction disk has a thread, so that a purely positive connection is produced between the locking element and the friction disk and between the locking element and the housing body even when a screw is used.

Depending on the intended operating load of the electromagnetic brake, it may be necessary for a plurality of locking elements to be used. A corresponding lug with a recess on the friction disk is preferably provided for each locking element. However, if the number of locking elements is less than the number of lugs, it is conceivable that a corresponding contour or recess is not provided on each lug.

If, optionally, more connecting elements are required to attach the electromagnetic brake to a component than to secure the friction disk against rotation, the other connecting elements can be guided through the electromagnetic brake or fastened to the electromagnetic brake at other positions which are independent of the friction disk or their lugs.

The mounting of the electromagnetic brake according to the invention overall does not require a positive or integral connection technology. It can be mounted exclusively via positive connections. In contrast to the prior art, the mounting of an electromagnetic brake according to the invention is thus easier to carry out. In particular, the mounting can be carried out in a simple manner in a partially automated or fully automated manner. This enables simple mounting in a manufacturing operation, which is designed in the spirit of industry 4.0, in particular with the aid of robots.

The invention is also directed to a lifting gear that comprises an electromagnetic brake according to the invention. In this application, the electromagnetic brake can be used, for example, for holding a load or for decelerating a drive of the lifting gear provided for raising and lowering a load. For this purpose, the brake disk of the electromagnetic brake is connected to a corresponding component of the lifting gear, that is to say a drive shaft of the lifting gear drive or lifting gear motor or to a cable drum of the lifting gear. In this case, the assembly can be carried out with a housing body resting directly on the respective component, in particular without the friction disk resting on the lifting gear drive or the cable drum and in particular without an air gap and seal between the housing body and the component.

The lifting gear can be installed, for example, in a crane or a stationary hoist, which usually serves to raise and lower loads, in the case of cranes in particular at different locations by moving the lifted loads horizontally within the working area of the crane.

According to the invention, a method for assembling an electromagnetic brake according to one of the previously described embodiments is created in that a coil unit is inserted into the housing body, in such a way that at least one positioning lug of the coil unit engages in a corresponding receptacle of the housing body as an anti-rotation means and/or in that the coil unit has an axially positive connection to the housing body by means of a snap-fit connection, wherein at least one snap hook of the coil unit is supported on a web of the housing body. However, it is also conceivable that a corresponding receptacle is arranged in the coil unit and a positioning lug corresponding thereto is arranged on or in the housing body.

In an advantageous embodiment, it is provided that an armature disk is inserted into the housing body, in such a way that at least one guide lug of the armature disk is guided in an associated guide groove of the housing body. Preferably, the step of mounting the armature disk in the housing body takes place after the above step of mounting the coil unit has been carried out.

It can be provided particularly advantageously that a friction disk is inserted into a recess in the housing body and is brought into engagement with the housing body by means of a receiving groove adjoined to the recess by a relative movement in the direction of rotation, wherein at least one lug, preferably three lugs, of the friction disk and the recess are no longer axially congruent after the relative movement. In other words, the friction disk has a positive, preferably bayonet-type, connection to the housing body, in that the lugs of the friction disk are guided through the recesses into the receiving groove(s) of the housing body adjoining thereto and away from the recesses into the receiving groove(s). The friction disk is rotated thereby relative to the housing body at least to such an extent that at least the contour of the lug and the corresponding negative contour in the recess are no longer axially congruent. The anti-rotation means of the friction disk can then also be produced as described above. Preferably, the step of mounting the friction disk in the housing body is effected in conclusion, i.e. after the above steps of mounting the coil unit and the armature disk have been carried out.

Figure 2:
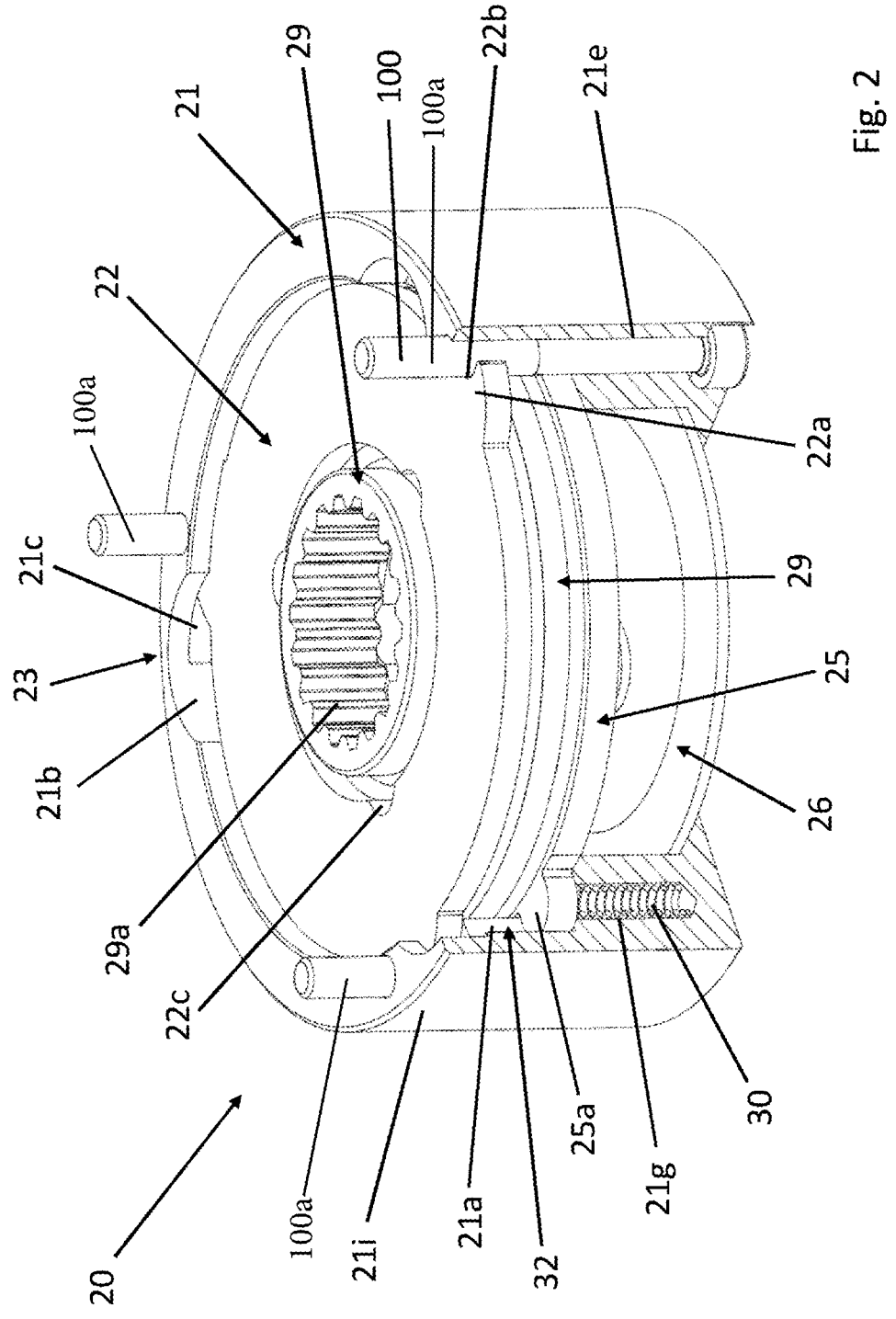
Figure 3:
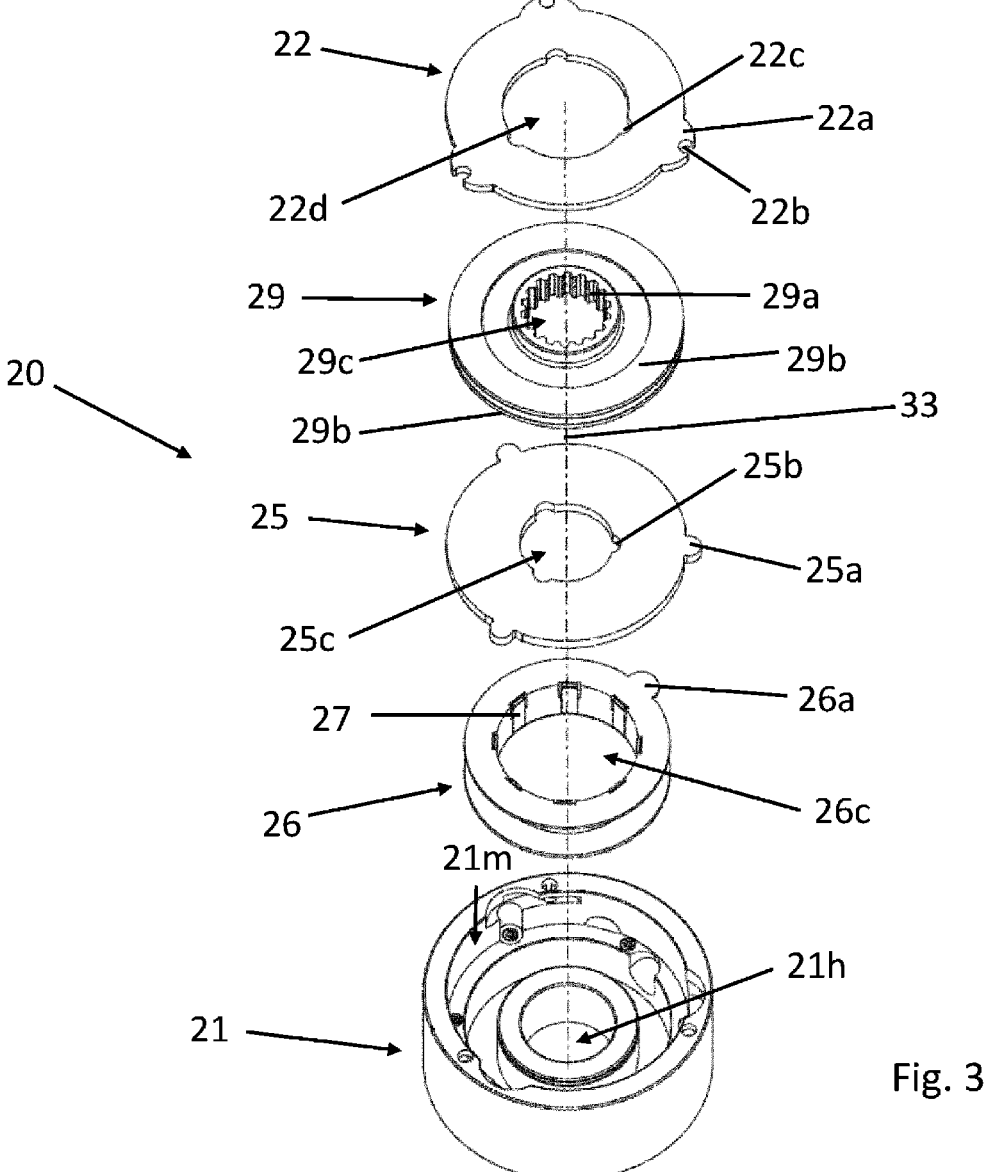
Figure 4A:
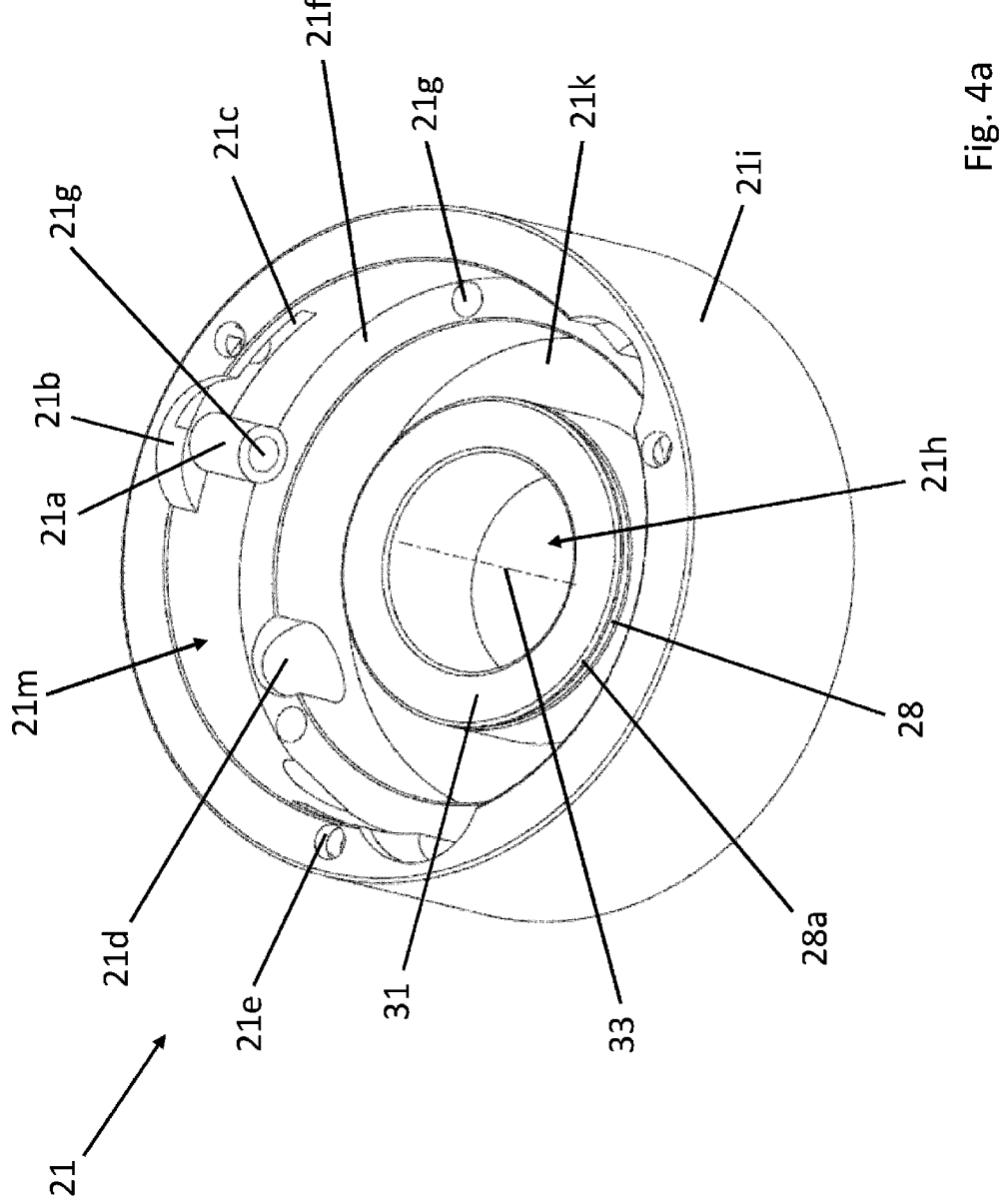
Figure 4B:
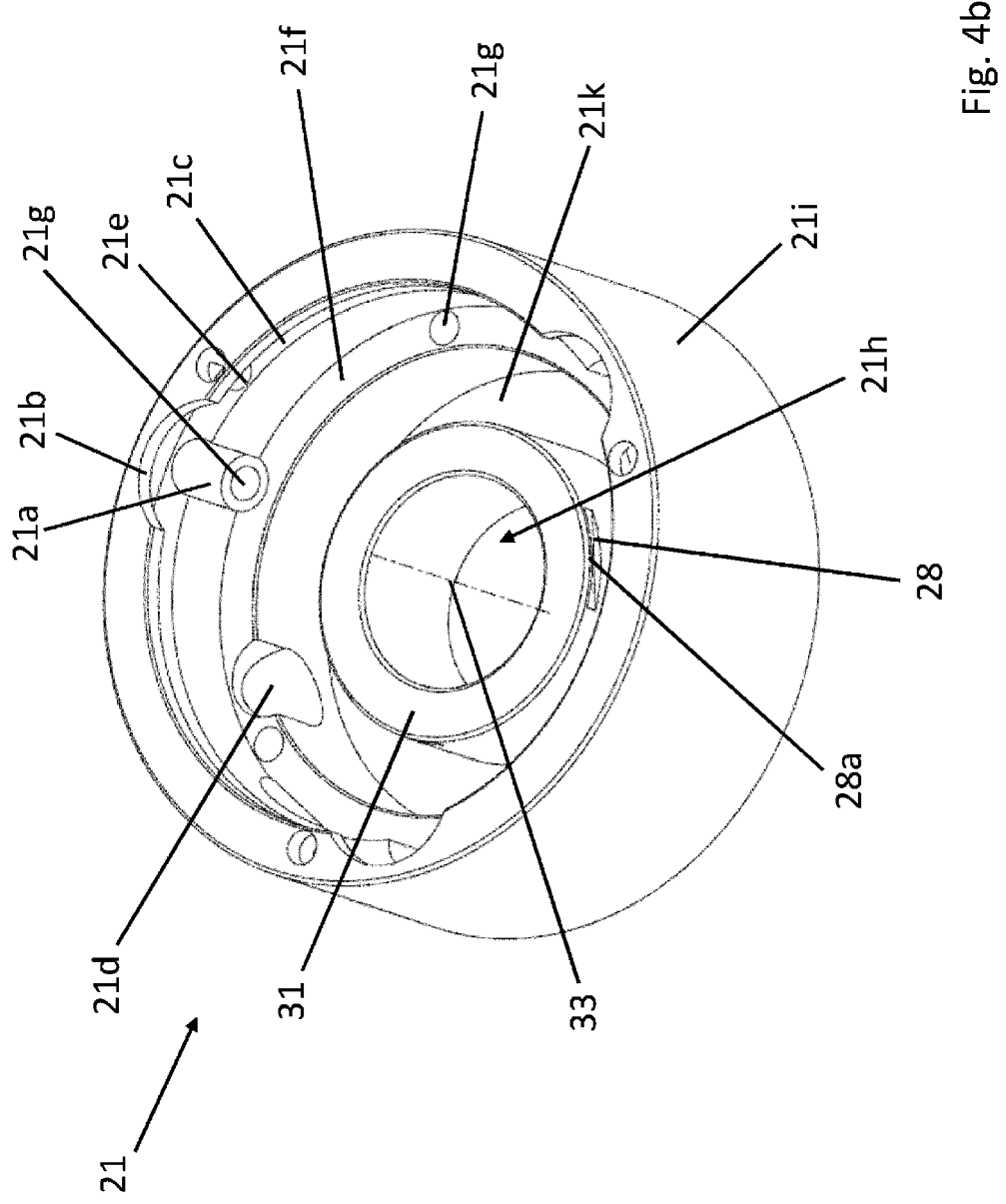
Figure 5:
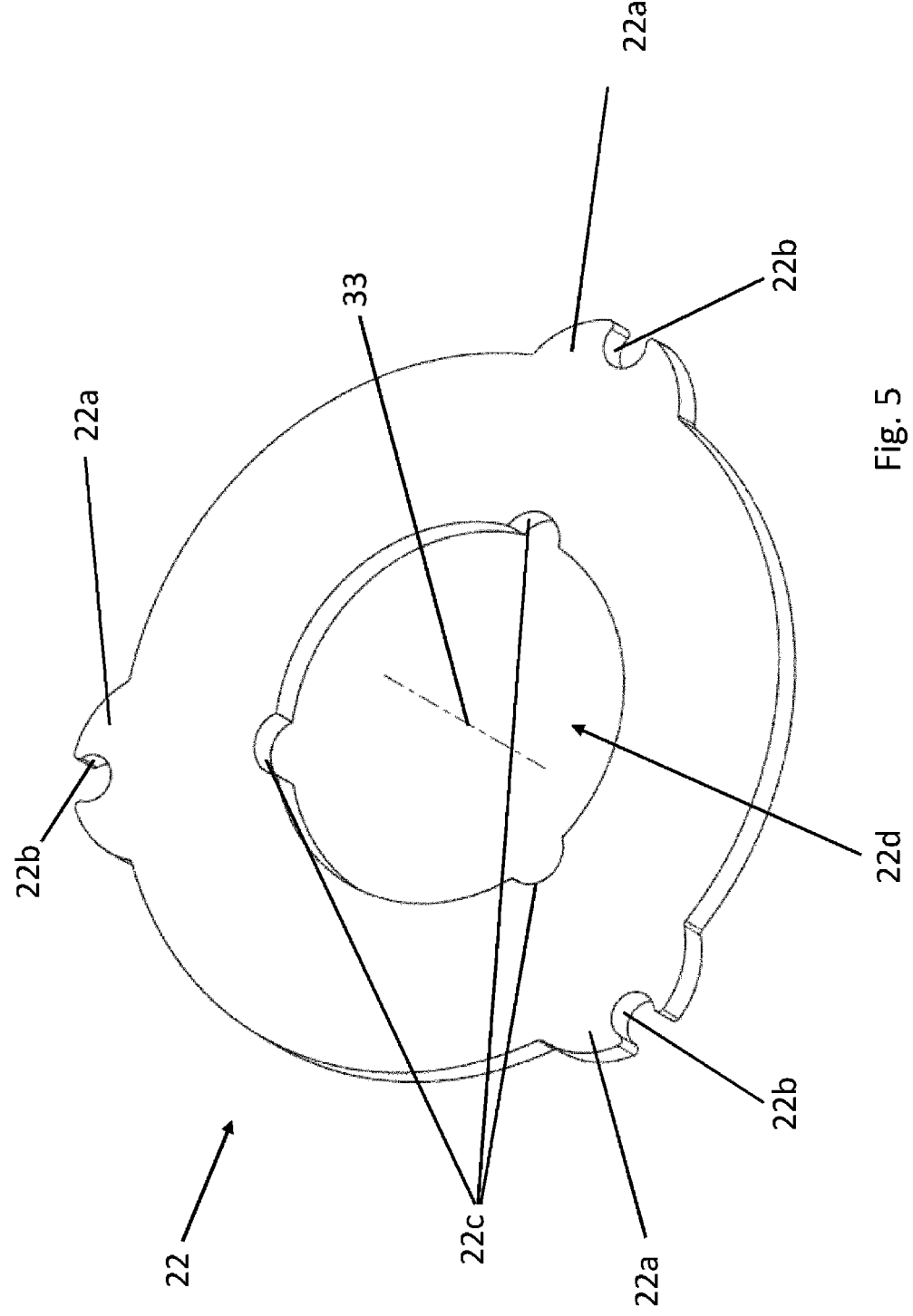
Figure 6:
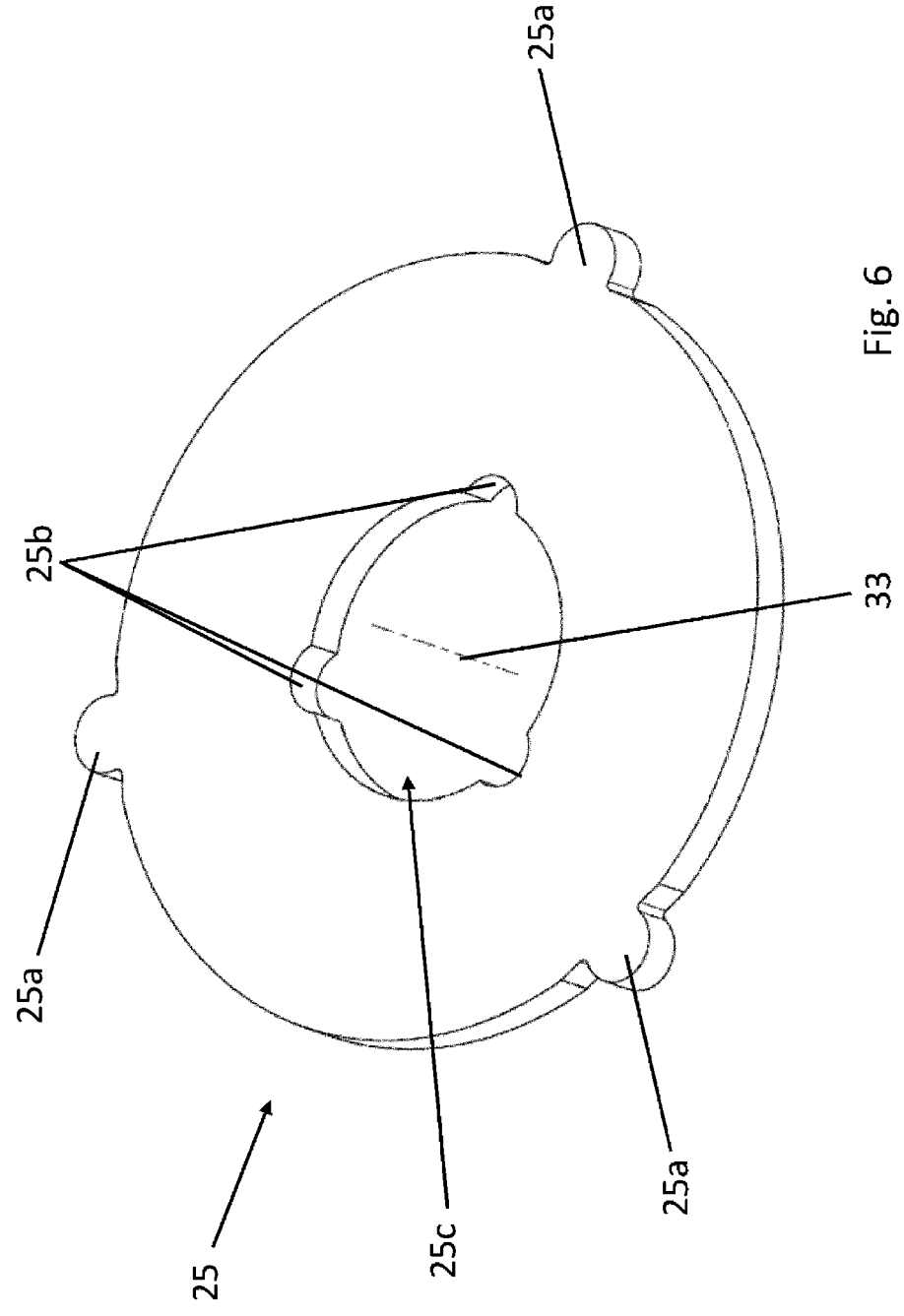
Figure 7:
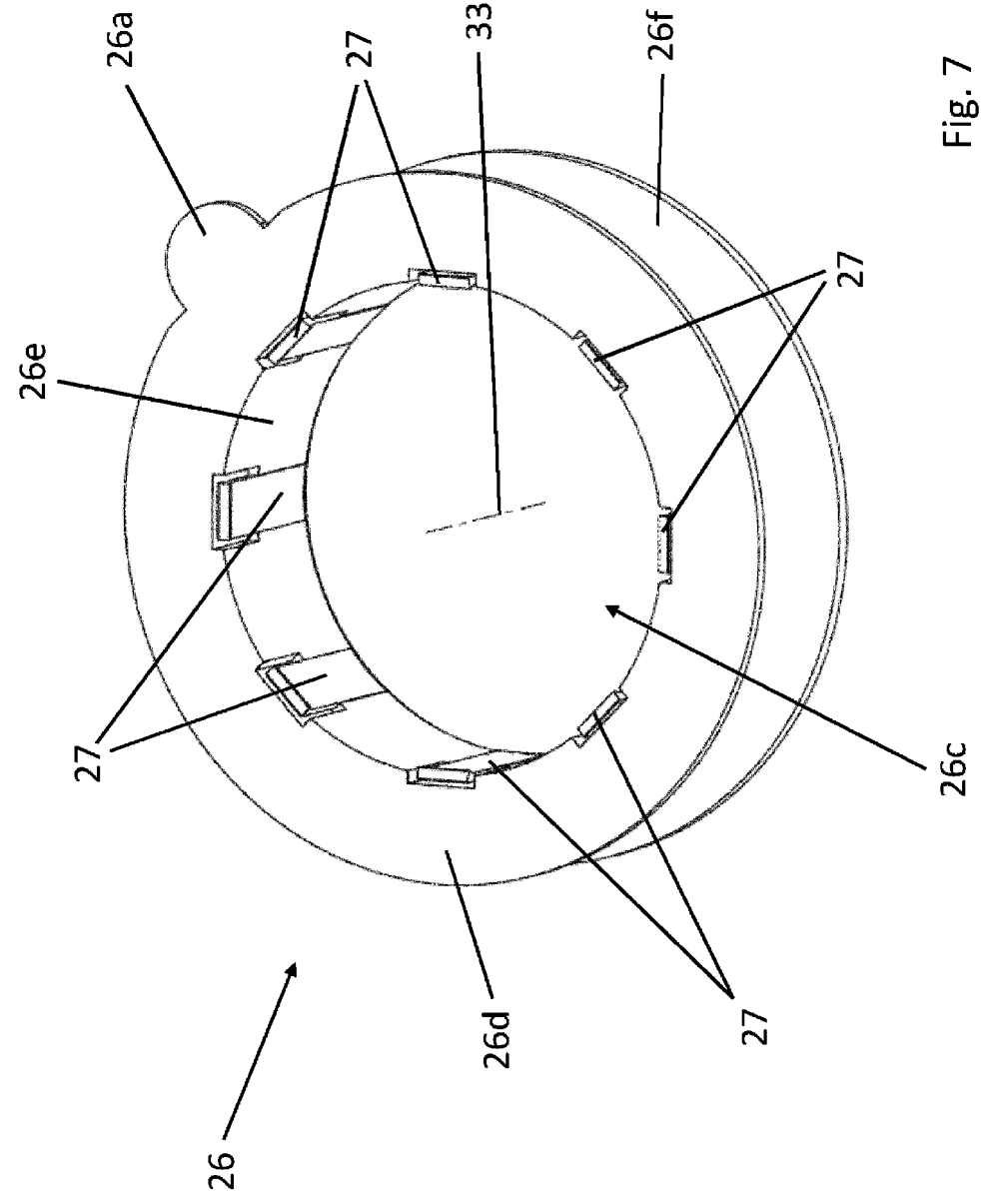

The invention is explained below with reference to drawings. The following are shown:

FIG. 1 shows a perspective view of a crane,

FIG. 2 shows a schematic sectional view of an embodiment of the electromagnetic brake according to the invention, FIG. 3 shows a schematic exploded view of the electromagnetic brake according to the invention according to the embodiment in FIG. 2, FIG. 4*a* shows a schematic perspective view of a housing body according to the embodiment in FIG. 2, FIG. 4*b* shows a schematic perspective view of a further embodiment of the housing body, FIG. 5 shows a schematic perspective view of a friction disk according to the embodiment according in FIG. 2, FIG. 6 shows a schematic perspective view of an armature disk according to the embodiment in FIG. 2, FIG. 7 shows a schematic perspective view of a coil unit according to the embodiment in FIG. 2, FIGS. 8*a*, 8*b* and 9 show schematic sectional views of the electromagnetic brake according to the invention according to the embodiment in FIG. 2, FIGS. 10, 11 and 12 show schematic perspective views of the electromagnetic brake according to the invention according to the embodiment in FIG. 2 in various states of assembly.

FIG. 1 shows an exemplary structure for a crane 1 in a perspective view. Manifestly, the crane 1 is embodied as a traveling crane in the form of a single-carrier bridge crane, which comprises a crane girder 2 mounted displaceably along a crane track (not shown). The crane girder 2 can be moved, driven by a motor, in particular by an electric motor, in a substantially horizontal direction of travel F transversely to its longitudinal direction x. For this purpose, a chassis 5, 6 driven by an electric motor, for example, is arranged on the opposite ends 3, 4 of the crane girder 2 in each case, which are supported in each case on a crane rail of the crane track, which is not shown in greater detail here. Arranged on the crane girder 2 is a crane trolley 7 with a lifting gear embodied as a cable pull, for example, which can be moved, together with the hoist and its lifting mechanism h, likewise driven by a motor or electric motor, in parallel to the longitudinal direction x of the crane girder 2, driven by a motor, in particular an electric motor, along the crane girder 2. The operation of the crane 1, that is to say in particular the control of movements and functions of the chassis 5, 6, the crane trolley 7 and the respective drive thereof, and the lifting gear h, takes place via a control switch 8, which in the present case is designed as a wired pendant control switch. The control switch 8 is communicatively connected to the control unit 9.

The crane 1 serves to raise and lower loads (not shown) by means of the lifting gear h at different locations and to horizontally move loads in the direction of travel F by means of the chassis 5, 6 and/or in the longitudinal direction x by means of the crane trolley 7 within the working area thereof. The lifting gear h comprises an electromagnetic brake 20 according to the invention (see, for example, FIG. 2). In this application, the electromagnetic brake 20 can be used, for example, for holding a load or for decelerating a drive provided for raising and lowering a load. For this purpose, a brake disk 29 of the electromagnetic brake 20 is connected to a drive shaft of the lifting gear drive or to a shaft of a cable drum of the lifting gear h.

However, such a lifting gear h with an electromagnetic brake 20 according to the invention can also be installed on other types of crane or another, for example stationary, hoist.

FIG. 2 shows a schematic sectional view of an embodiment of the electromagnetic brake 20 according to the invention. Apart from a housing body 21 and a friction disk 22, the electromagnetic brake 20 comprises a coil unit 26, a pole core 31 that is arranged within the coil unit 26 and can be excited thereby, at least one compression spring 30, an armature disk 25 and a brake disk 29. The friction disk 22, the coil unit 26, the pole core 31, the compression spring 30, the armature disk 25 and the brake disk 29 are arranged in the housing body 21 in the state of assembly shown.

The annular friction disk 22 is positively connected to the housing body 21 via a bayonet-type connection. For this purpose, the friction disk 22 has three lugs 22*a* mounted in the receiving grooves 21*c* which are introduced into the housing body 21 and extend around sections of the circumference. For this purpose, the lugs 22*a* were aligned congruently with the recesses 21*b* of the housing body 21, axially moved into the recesses 21*b* and rotated by a subsequent relative movement in the direction or rotation and thus guided into the receiving grooves 21*c* adjoining the recesses 21*b*, and, for example, the friction disk 22 was rotated in a clockwise direction or the housing body 21 rotated counterclockwise.

The friction disk 22 is secured against rotation relative to the housing body 21, in particular during operation of the electromagnetic brake 20, by means of three locking elements 100. This makes it possible to prevent the friction disk 22 from rotating after its positioning, which is done during assembly, and thereby prevent the lugs 22 *a* from moving out of the receiving grooves 21 *c* in the direction of the recesses 21 *b* in such a way that an unintentional release of the bayonet-like connection 23 between the friction disk 22 and the housing body 21 is possible. The locking elements

100 are connecting elements, which are used to attach the electromagnetic brake 20 to a component, in particular to flange mount on a motor or a cable drum of a lifting gear h. The locking element 100 shown by way of example is a screw having a threaded end 100*a*.

The locking element 100 in each case is guided through a through hole 21*e* in a casing wall 21*i* of the housing body 21 and through a recess 22*b* in the associated lug 22*a* of the friction disk 22. A thread is not introduced into the through holes 21*e* or into the recesses 22*b*, so that a purely positive connection is produced between the locking element 100 and the friction disk 22 and between the locking element 100 and the housing body 21.

The number of locking elements 100 and thus the recesses 22*b* in the lugs 22*a* of the friction disk 22 can also be less than the number of lugs 22*a*. If, optionally, more connecting elements are required to attach the electromagnetic brake 20 to a component than to secure the friction disk 22 against rotation, the other connecting elements can be guided through the electromagnetic brake 20 or fastened to the electromagnetic brake 20 at other positions which are independent of the friction disk 22 or their lugs 22*a*.

The axially displaceable armature disk 25 is arranged above the coil unit 26. The armature disk 25 has, by way of example, three guide lugs 25*a* which serve to axially guide the armature disk 25 in the guide grooves 21*a* provided internally for this purpose in the casing wall 21*i* of the housing body 21. A groove-lug connection 32 thus exists between the armature disk 25 and the housing body 21.

The brake disk 29 is arranged between the armature disk 25 and the friction disk 22 and is configured to be rotatable and axially displaceable. The brake disk 29 has an internal sprocket 29*a* by means of which the brake disk 29 can be connected to a drive shaft (not shown) to be braked by the electromagnetic brake 20.

The at least one compression spring 30 is arranged and configured such that the armature disk 25 is axially displaceable towards the brake disk 29 by means of its compressive force. In the embodiment shown, six compression springs 30 are arranged uniformly over the circumference of the electromagnetic brake 20 in the casing wall 21*i* of the housing body 21. However, it is also conceivable for a different number of compression springs 30 to be distributed, preferably uniformly, over the circumference of the electromagnetic brake 20. Alternatively, a single compression spring 30 may also be arranged such that it partially or completely surrounds the pole core 31.

The coil unit 26 and the pole core 31 are arranged and configured such that a tensile force can be generated by the pole core 31, which is electromagnetically excited by means of the coil unit 26, by means of which tensile force the armature disk 25 is axially displaceable away from the brake disk 29 counter to the spring force of the compression spring(s) 30.

In a first operating state of the electromagnetic brake 20, the braking, the armature disk 25 presses the brake disk 29 against the friction disk 22 by means of the compressive force of the six compression springs 30, in order to brake the brake disk 29 by means of the braking torque produced between the brake disk 29 and the friction disk 22 and/or between the brake disk 29 and the armature disk 25. In the region of its outer diameter, the brake disk 29 has one or more brake pads 29*b* on both opposite sides (see FIGS. 8*a* and 8*b*). The friction disk 22 and/or the armature disk 25 preferably has/have a suitably structured surface on the side respectively directed toward the brake disk 29, in order to ensure an optimal deceleration of the brake disk 29 during braking.

In a second operating state of the electromagnetic brake 20, the release, the armature disk 25 is arranged at a distance from the brake disk 29 by means of a tensile force generated by the coil unit 26 and the pole core 31, which is greater than the compressive force of the six compression springs 30, such that a free and thus unbraked rotation of the brake disk 29 is made possible. In the second operating state, the armature disk 25 can rest on a shoulder 21*f* (see, for example, FIG. 4*a*) of the casing wall 21*i* of the housing body 21 and support it on the latter with sufficient tensile force.

During braking, the friction disk 22 is pressed by means of the compressive force generated by the compression spring(s) 30 via the armature disk 25 and the brake disk 29 onto an outer web of the receiving groove 21*c*. The outer web of the receiving groove 21*c* delimits a first opening 21 *m* (see, for example, FIG. 3) of the housing body 21 opposite the base 21*k* of the housing body 21. During the release, the friction disk 22 is pulled onto the inner web of the receiving groove 21*c* by means of the magnetic field generated by the coil unit 26 and the pole core 31 or the resulting tensile force in the direction of the base 21*k*.

In spite of a purely positive, bayonet-type connection 23 between the housing body 21 and the friction disk 22 produced during the mounting of the electromagnetic brake 20, the friction disk 22 is thus pulled or pressed during operation by the acting forces against one of the webs delimiting the receiving groove 21*c*. Vibrations on the friction disk 22 and thus noise generation during the operation of the electromagnetic brake 20 can thus be reduced or even avoided.

FIG. 3 shows a schematic exploded view of the electromagnetic brake 20 according to the invention according to the embodiment in FIG. 2. The design of the electromagnetic brake 20 or the arrangement of the associated components housing body 21, coil unit 26, armature disk 25, brake disk 29 and friction disk 22 relative to one another in the axial direction of the electromagnetic brake 20 can be clearly seen. Said components are aligned for mounting on the central axis 33 so that the holes 21*h*, 22*d*, 25*c*, 26*c*, 29*c* are concentrically aligned in all components in order to be able to mount a drive shaft, for example. Subsequently, the components mentioned are arranged concentrically in the housing body 21 with respect to the central axis 33, wherein they are aligned in their respective plane in such a way that the respective lug 22*a*, guide lug 25*a*, positioning lug 26*a* can be inserted into the corresponding recess 21*b*, guide groove 21*a* and/or receptacle 21*d* of the housing body 21.

Furthermore, the statements relating to FIG. 2 also apply analogously to the illustration shown in FIG. 3.

FIG. 4*a* shows a schematic perspective view of the housing body 21 according to the embodiment in FIG. 2. The housing body 21 has a substantially hollow cylindrical and annular shape with a circular base area. The housing body 21 is formed in one piece here.

The housing body 21 has a first opening 21 *m* on its end face opposite the base 21*k*. The bottom 21*k* has a smaller second opening 21 *h* compared to the first opening 21*m*. The aforementioned drive shaft (not shown) to be braked can, for example, be guided through the second opening 21*h*. The housing body 21 also has special form details which are required for the mounting and functioning of the electromagnetic brake 20. Said form details will be discussed in the following description.

The first opening 21 *m* extends up to the casing wall 21*i* and is delimited by the latter. In the region of the first opening 21*m*, the housing body 21 in the casing wall 21*i* has three recesses 21*b* with receiving grooves 21*c* adjoining thereto. The recesses 21*b* are arranged on a web formed by the casing wall 21*i* and delimiting the receiving grooves 21*c* on the end face of the housing body 21. The receiving grooves 21*c* extend in sections circumferentially and spaced apart from one another in the casing wall 21*i* of the housing body 21. Said arrangement of the receiving grooves 21*c* extending in sections has the advantage that the end-mounted position of the friction disk 22 in the housing body 21 can be pre-determined in a simple manner by the end of the receiving groove 21*c* facing away from the recess 21*b* and thus the subsequent assembly steps can be simplified. The recesses 21*b* enable the friction disk 22 to be inserted into the receiving grooves 21*c* and thus the positive bayonet-type connection 23 between the housing body 21 and the friction disk 22 to be produced.

The guide grooves 21*a* for guiding the armature disk 25 are arranged such that the guide lugs 25*a* of the armature disk 25 can be inserted through the respective recess 21*b* into the guide grooves 21*a*. The anchor disk 25 can be mounted on the shoulder 21*f* of the casing wall 21*i* of the housing body 21, which connects the base 21*k* to the casing wall 21*i*.

The pole core 31 is annular and arranged in the housing body 21, in particular embedded in the wall thereof or formed therefrom. The pole core 31 surrounding the opening 21 *h* in the base 21*k* is spaced apart from the casing wall 21*i* or from the shoulder 21*f* of the housing body 21 in such a way that the coil unit 26 can be arranged therebetween. The pole core 31 and the housing body 21 share the same central axis 33. In the embodiment shown, the pole core 31 is part of the housing body 21. Since the pole core 31 has to be made of a magnetic material, the entire housing body 21 in this exemplary embodiment is made of a magnetic material. A circumferential groove 28 is arranged on the outer diameter of the pole core 31, in which circumferential groove the snap hooks 27 of the coil unit 26 can engage and be mounted. When a force occurs in the direction of the first opening 21*m*, the snap hooks 27 are then supported parallel to the central axis 33 on a web 28*a* delimiting the groove 28.

In addition, the housing body 21 has a receptacle 21*d* in its casing wall 21*i* or in the shoulder 21*f*, into which a positioning lug 26*a* of the coil unit 26 is inserted, in order to secure the coil unit 26 against rotation relative to the housing body 21.

A plurality of blind bores 21*g* in the shoulder 21*f* serves to receive the compression springs 30. Said compression springs are distributed uniformly on the circumference of the shoulder 21*f*. In the present exemplary embodiment, there are six blind holes 21 *g*, so that all six compression springs 30 can be installed.

A plurality of through holes 21*e*, which extend parallel to the central axis 33 through the casing wall 21 *i* of the housing body 21, serves to feed the locking elements 100 through. The through holes 21*e* also extend in each case through the receiving groove 21*c*, which serve to receive the friction disk 22. The through holes 21*e* do not have a thread.

FIG. 4*b* shows a schematic perspective view of a further embodiment of the housing body 21. This embodiment differs from the embodiment shown in FIG. 4*a* in that only a single receiving groove 21*c* is introduced circumferentially over the entire circumference in the housing body 21 or casing wall 21*i* thereof, and instead of a single circumferential groove 28 or a circumferential web 28*a* for supporting the snap hooks 27, several thereof are introduced in sections circumferentially and spaced apart from one another.

However, embodiments are also conceivable in which only one single receiving groove 21*c* and one single groove 28, each over the entire circumference, are provided circumferentially, or both the receiving grooves 21*c* and the grooves 28 are each introduced only in sections circumferentially and spaced apart from one another. Furthermore, the statements relating to FIG. 4*a* also apply analogously to the illustration shown in FIG. 4*b*.

FIG. 5 shows a schematic perspective view of a friction disk 22 according to the embodiment in FIG. 2. The friction disk 22 is rotationally symmetrical and comprises three, approximately semicircular, outwardly directed lugs 22*a*, which are each arranged at an angle of 120° on the circumference of the friction disk 22. The number of lugs 22*a* can be varied, but should be at least two so that a lifting of the friction disk 22 out of the housing body 21 can be avoided. In addition, it is advantageous if the lugs 22*a* are distributed uniformly on the circumference of the friction disk 22. A recess 22*b* is arranged in each of the lugs 22*a*, through which the locking elements 100 are inserted during attachment of the electromagnetic brake 20 to another component, in order to prevent rotation of the friction disk 22 about the central axis 33. It is also conceivable that a recess 22*b* is not introduced in each lug 22*a*.

The friction disk 22 has a hole in its center, which hole is dimensioned such that the drive shaft (not shown) to be braked can be guided through. The recesses 22*c* at the inner diameter of the friction disk 22 serve the improved flow of force in the friction disk 22 as well as a positionally accurate gripping of the friction disk 22, for example by means of a robot gripper, and a precise positioning of the friction disk 22 in the housing body 21 even with narrow tolerances. The surface of the friction disk 22 is designed accordingly for optimal deceleration at least on the side that is provided for brake contact with the brake disk 29.

FIG. 6 shows a schematic perspective view of the armature disk 25 according to the embodiment in FIG. 2. The armature disk 25 is rotationally symmetrical and comprises three, approximately semicircular, outwardly directed guide lugs 25*a*, which are each arranged at an angle of 120° on the circumference of the armature disk 25. The three guide lugs 25*a* allow the armature disk 25 to be guided without tilting in the housing body 21.

The armature disk 25 has a hole 25*c* in its center, which hole 25*c* is dimensioned such that the drive shaft (not shown) to be braked can be guided through. The recesses 25*b* at the inner diameter of the armature disk 25 serve the improved flow of force in the armature disk 25 as well as a positionally accurate gripping of the armature disk 25, for example by means of a robot gripper, and a precise positioning of the armature disk 25 in the housing body 21 even with narrow tolerances. The surface of the armature disk 25 is designed accordingly for optional deceleration at least on the side that is directed towards the brake disk 29.

FIG. 7 shows a schematic perspective view of a coil unit 26 according to the embodiment in FIG. 2. The coil unit 26 has a substantially annular geometry with an outwardly directed, open C-shaped cross section. The C-shaped cross section is formed by a substantially horizontally extending upper limb 26*d*, a substantially horizontally extending lower limb 26*f* and a web 26*e* connecting the two limbs 26*d*, 26*f* and extending substantially at right angles to the limbs 26*d*, 26*f*.

In this embodiment, the coil unit 26 has eight snap hooks 27. However, the number of snap hooks 27 can be varied taking into account the forces occurring in both axial directions. Each snap hook 27 is dimensioned and designed in terms of material technology in such a way that, during the mounting of the coil unit 26 in the housing body 21 by applying a force that acts in parallel with the central axis 33, said snap hook can elastically deform outward in the direction of the base 21k of the housing body 21, in such a way that the snap hook 27 can latch into the groove 28. The snap hooks 27 are an integral component of the coil unit 26. However, it is also conceivable for the snap hooks 27 to be connected to separate components and to the coil unit 26.

The coil unit 26 also has one, approximately semicircular positioning lug 26a, which serves to secure against rotation in the housing body 21. In addition, the positioning lug 26a in housing bodies 21, in which a plurality of grooves 28 is present in sections, can serve such that in each case a snap hook 27 is positioned congruently with one of the grooves 28 during the assembly of the coil unit 26.

The coil unit 26 is designed as a coil carrier and is suitable for receiving one or more coils (not shown) necessary for generating a magnetic field. The coils are arranged or mounted in the outwardly open, C-shaped structure of the coil unit 26.

Figure 8A:
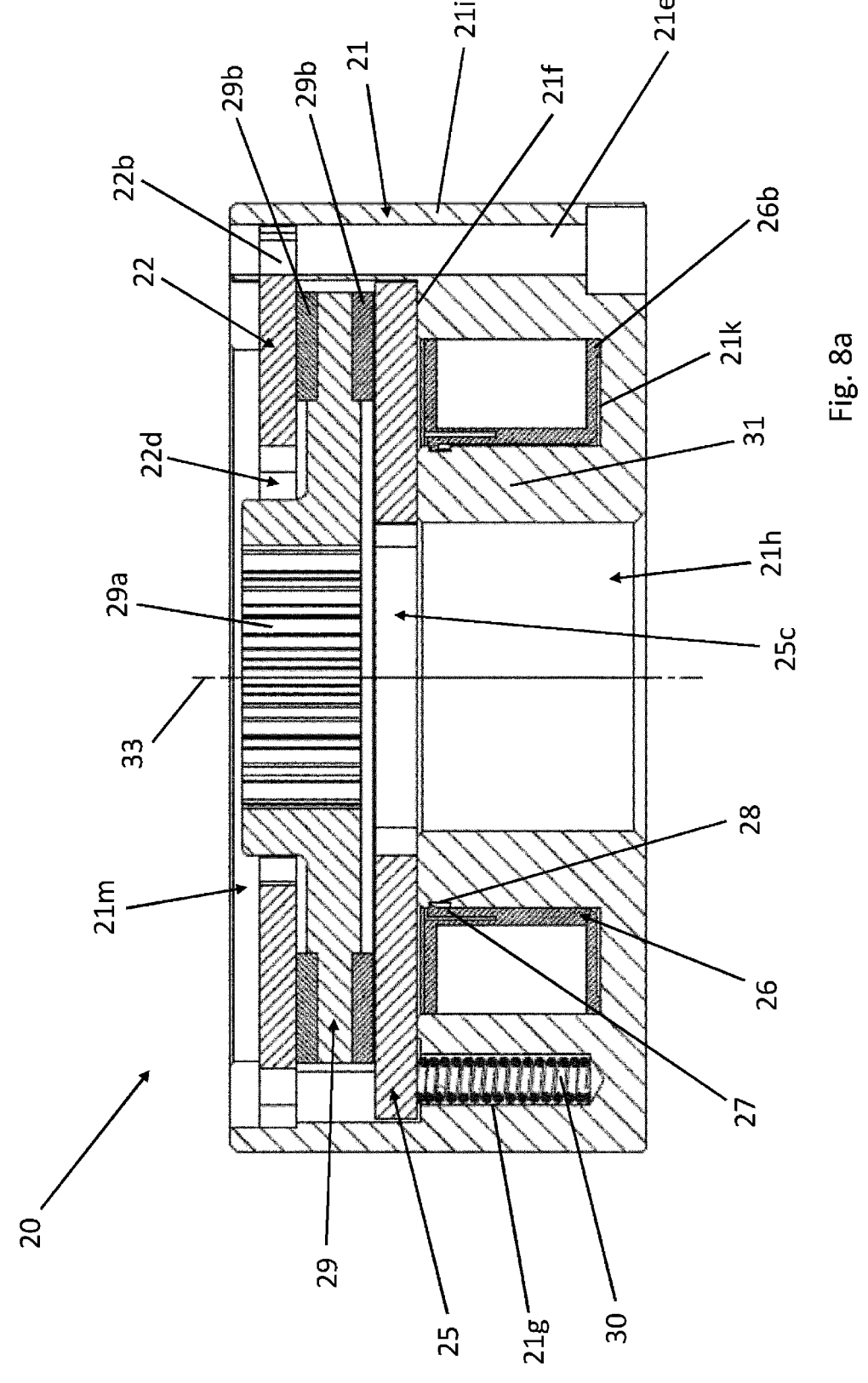
Figure 8B:
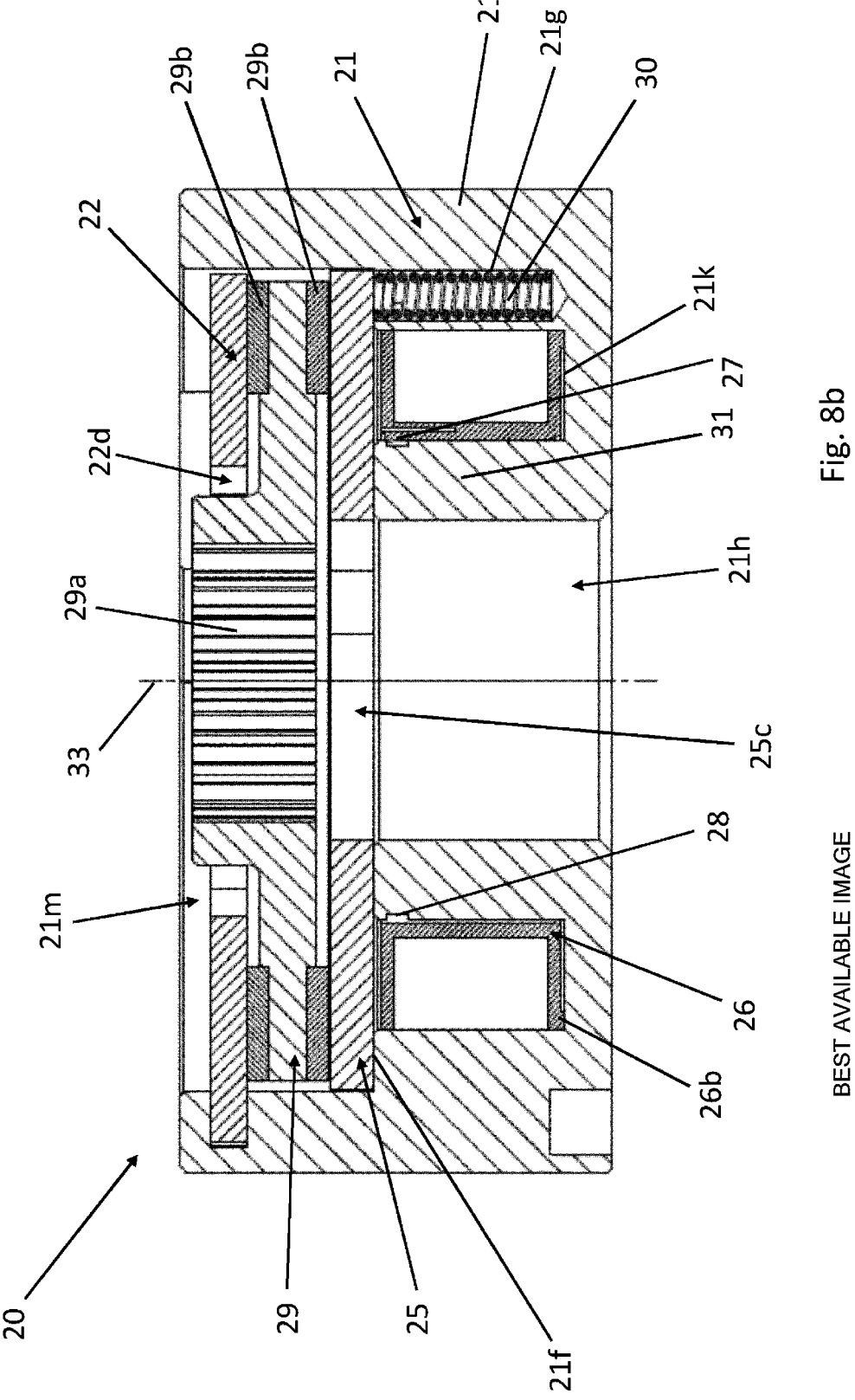
Figure 9:
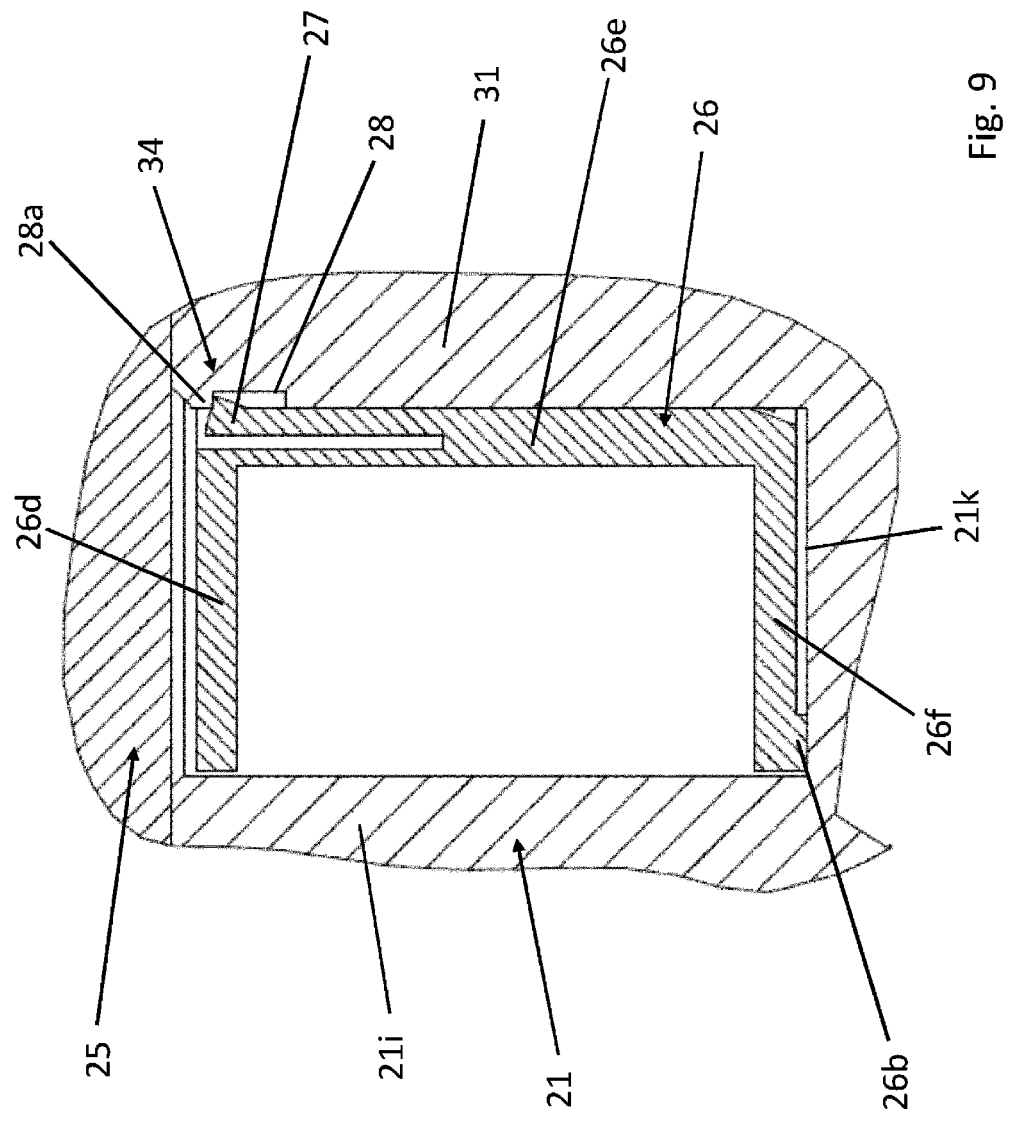

FIGS. 8a, 8b and 9 show schematic sectional views of the electromagnetic brake 20 according to the invention according to the embodiment in FIG. 2. The structure of the mounted electromagnetic brake 20 can be clearly seen in FIGS. 8a and 8b.

The housing body 21 has a recess dimensioned according to the dimensions of the coil unit 26 between its casing wall 21i and the pole core 31. The recess is designed in such a way that during the assembly of the coil unit 26 a play required therefor is present and the nevertheless sufficient fixing of the coil unit 26, in particular during the operation of the electromagnetic brake 20, is ensured. The snap hooks 27 of the coil unit 26 are mounted in the groove 28 and are supported on the web 28a of the housing body 21 (see FIG. 9). The coil unit 26 is thus exclusively positively connected to the housing body 21.

The armature disk 25 is arranged between the first opening 21m of the housing body 21 and the coil unit 26. So that the armature disk 25 can rest on the shoulder 21f, the upper limb 26d of the coil unit 26 directed toward the first opening 21m of the housing body 21 is correspondingly spaced apart from the shoulder 21f. The tensile force can be generated by means of the pole core 31 excited by the coil unit 26, by means of which tensile force the armature disk 25 is axially displaceable away from the brake disk 29 for releasing the brake 20.

The six compression springs 30 are each arranged in the blind holes 21g. FIGS. 8a and 8b each show only one blind hole 21g and one compression spring 30 thereof. The compression springs 30 are configured to axially displace the armature disk 25 towards the brake disk for braking 29 by means of their compressive force.

The friction disk 22 is arranged between the end face of the housing body 21 and the brake disk 29. The brake disk 29 arranged between the axially displaceable armature disk 25 and the friction disk 22 is configured so as to be rotatable about the central axis 33 and axially displaceable. In the region of its outer diameter, the brake disk 29 has one or more brake pads 29b on both opposite sides. In this way, optimal braking can be achieved, in particular in combination with the aforementioned surfaces on the friction disk 22 and/or the armature disk 25.

In FIG. 9, the region from FIGS. 8a and 8b is shown enlarged, from which the installation situation of the coil unit 26 in the housing body 21 and the C-shaped cross section formed by the legs 26d, 26f and the web 26e can be clearly seen, which C-shaped cross section is open outwardly toward the casing wall 21i.

Like the other snap hooks 27, the snap hook 27 shown is an integral component of the coil unit 26, engages in the groove 28 and supports the coil unit 26 on the web 28a on the housing body 21. The coil unit 26 is thus positively connected to the housing body 21 by means of a snap connection 34.

To produce the snap connection 34, the snap hook 27 is elastically deformed in the direction of the casing wall 21i of the housing body 21. In other words, during the mounting of the coil unit 26, the snap hooks 27 are bent back radially outward, in order then to latch radially inward into the groove 28 of the housing body 21. For this purpose, the coil unit 26 has a slot-shaped recess extending along the web 26e in the region of the snap hooks 27. The elastic deformation takes place due to a force that acts in particular parallel to the central axis 33 in the direction of the base 21k of the housing body 21.

The coil unit 26 is mounted on a shoulder 26b on the base 21k of the housing body 21. The shoulder 26b creates a space between the coil unit 26 and the housing body 21 in the region of the diameter on which the snap hooks 27 are arranged. As a result, the coil unit 26 is axially movable relative to the housing body 21 in the region of the snap connection 34, in order to simplify assembly. The space can thus be used as a type of spring travel to press the limb 26f of the coil unit 26 facing the base 21k, during its mounting outside the shoulder 26b about the shoulder 26b serving as a pivot point, in the direction of the base 21k of the housing body 21 and thus to bend in this direction, so that the snap hooks 27 can more easily latch into the groove 28 of the housing body 21. In other words, the coil unit 26 is designed to be flexible or resilient so that a latching of the snap hooks 27 is ensured even in the case of manufacturing inaccuracies.

Figure 10:
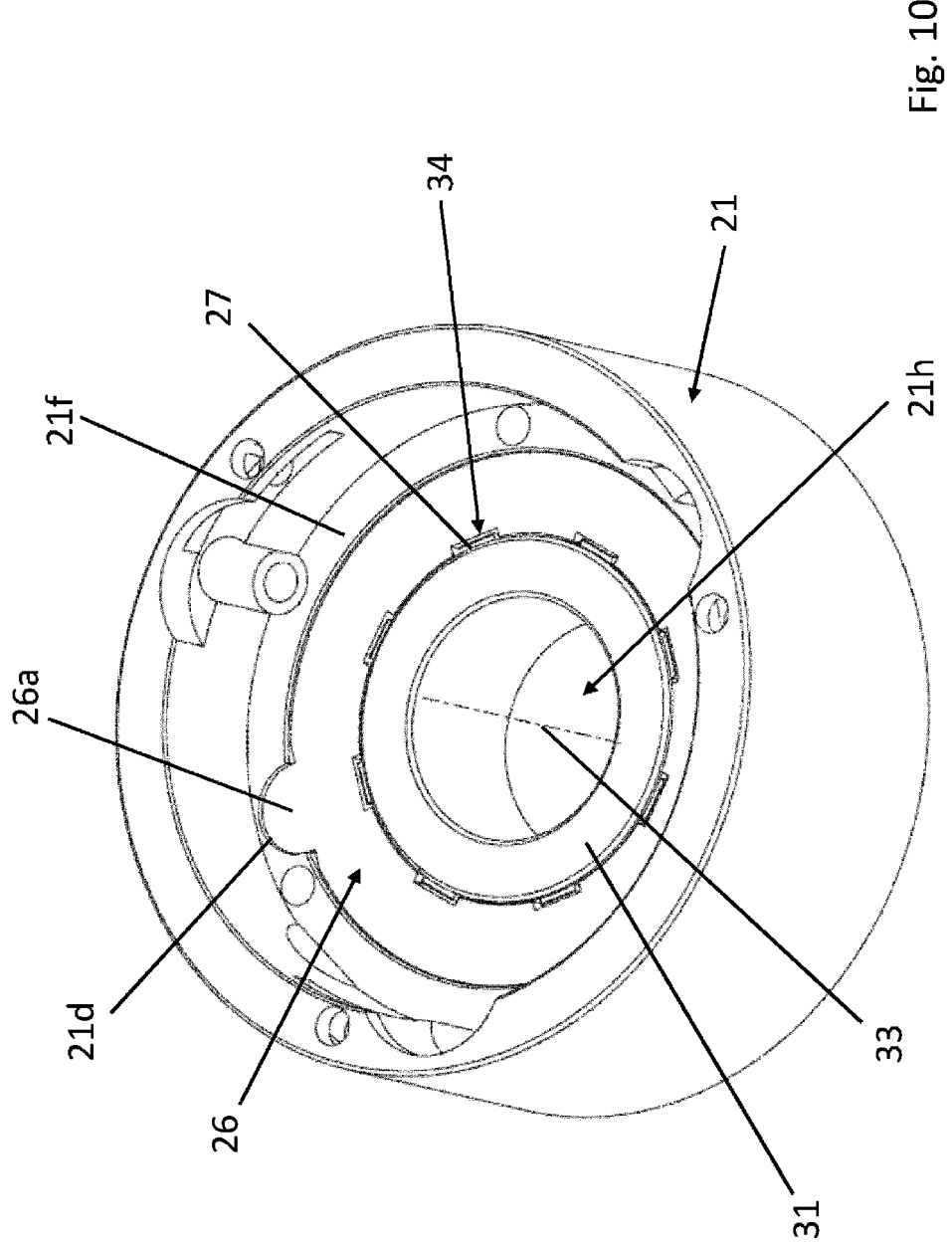
Figure 11:
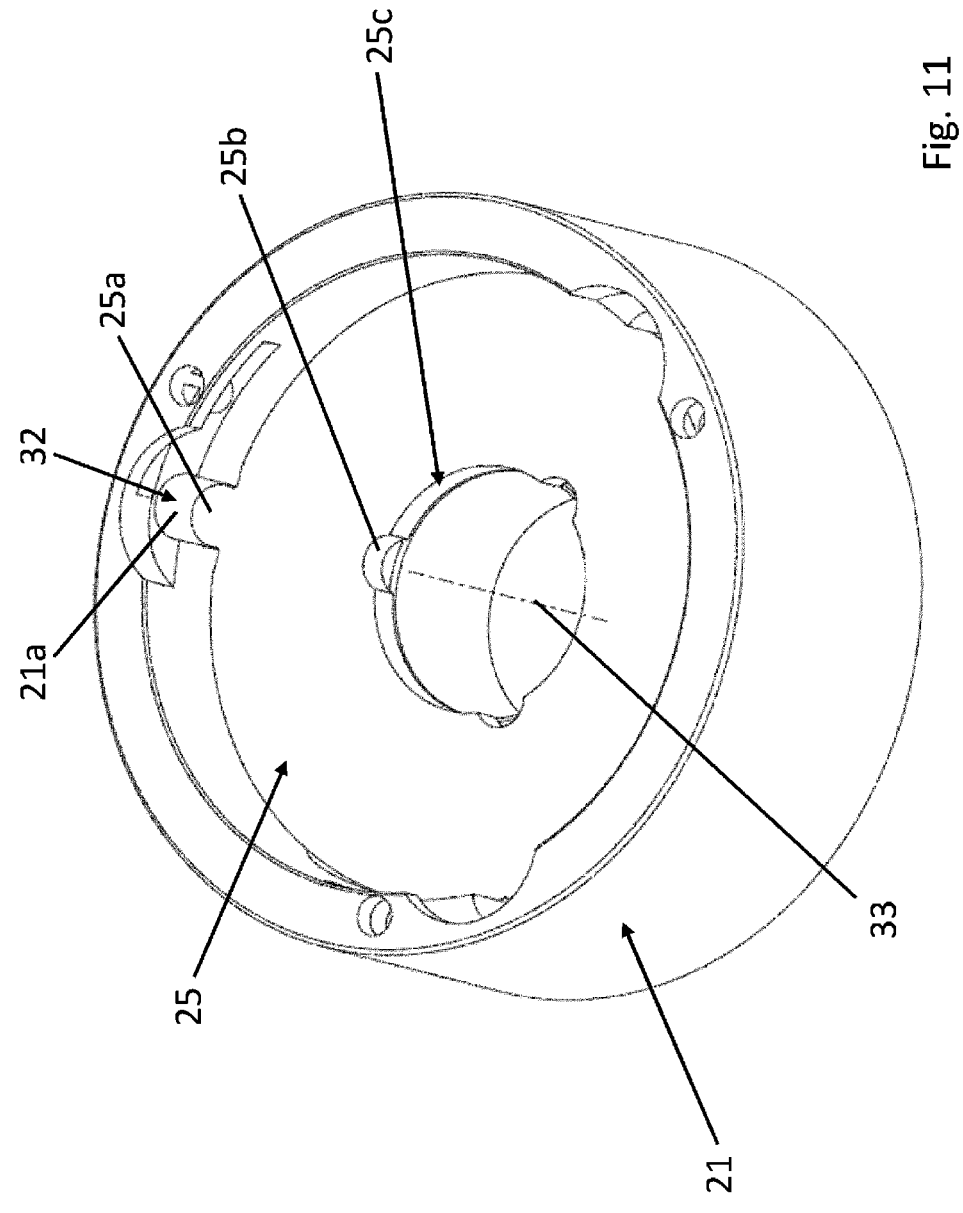
Figure 12:
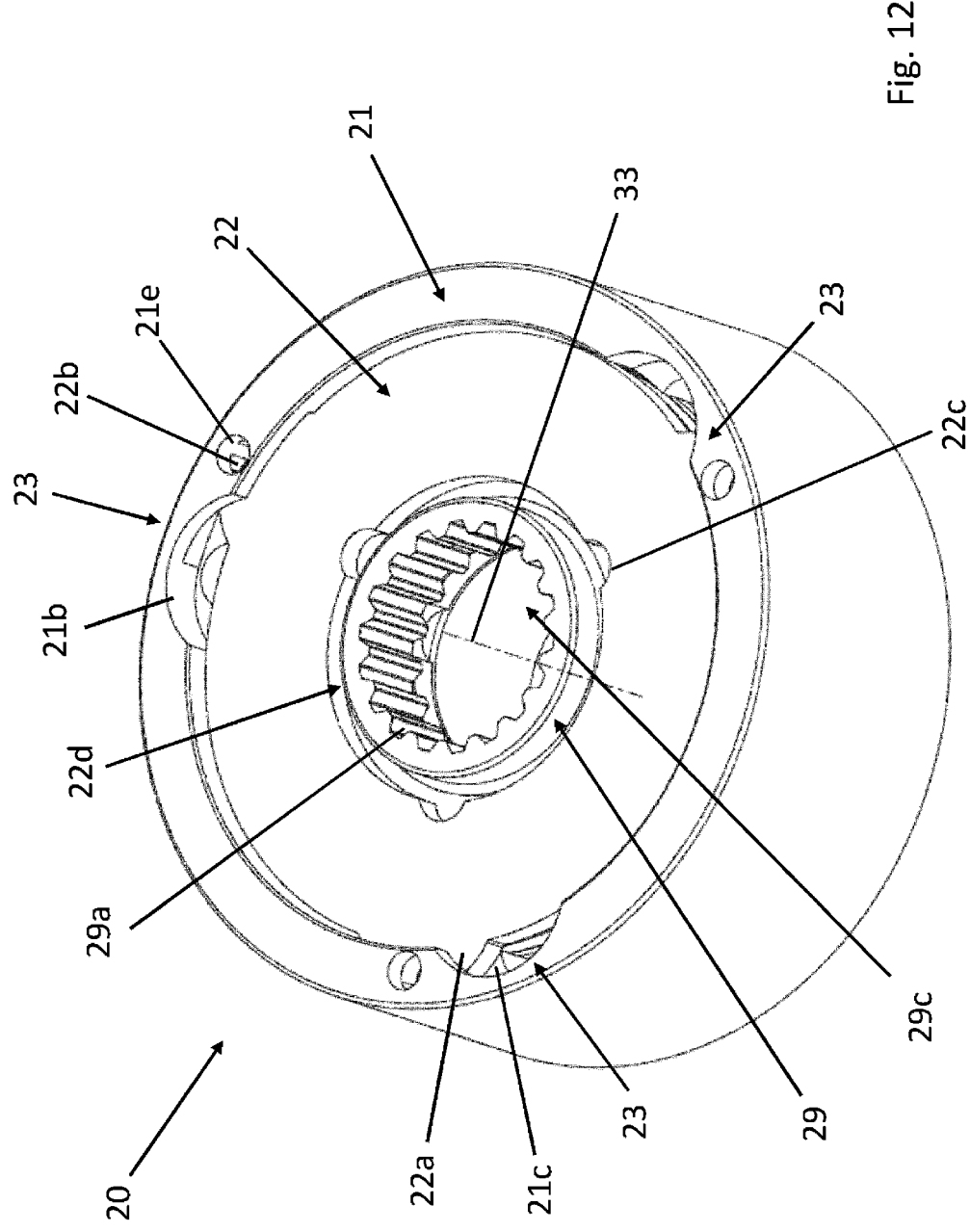

FIGS. 10, 11 and 12 show schematic perspective views of the electromagnetic brake 20 according to the invention according to the embodiment in FIG. 2 in various states of assembly.

In FIG. 10, only the coil unit 26 is shown installed in the housing body 21. To prevent rotation of the coil unit 26, the positioning lug 26a arranged thereon engages in the corresponding receptacle 21d on the housing body 21. A purely positive snap connection 34 is thus produced between the coil unit 26 and the housing body.

FIG. 11 additionally shows the armature disk 25 in the housing body 21. The armature disk 25 is inserted into the housing body 21 in such a way that each guide lug 25a of the armature disk 25 is guided in an associated guide groove 21a of the housing body 21. The armature disk 25 is guided axially in the housing body 21 exclusively via the groove-lug connection thus formed. The outer contour of the guide lugs 25a is preferably designed to correspond to the inner contour of the guide grooves 21a. However, sufficient play for an axial movement of the armature disk 25 is provided between the outer contour of the guide lugs 25a and the inner contour of the guide grooves 21a.

In FIG. 12, the brake disk 29 and the friction disk 22 are additionally shown in the housing body 21. The friction disk 22 is positively connected to the housing body 21. For the bayonet-type connection 23, the lugs 22a of the friction disk 22 are guided through the recesses 21b into the receiving grooves 21c of the housing body 21 and are displaced in said receiving grooves in the direction of rotation. The friction disk 22 and the housing body 21 are thus rotated relative to one another about the central axis 33. After this relative movement, the three lugs 22a of the friction disk 22 and the recess 21b are no longer axially congruent, that is to say substantially parallel to the central axis 33.

The three connecting elements, which in this case simultaneously all serve as locking elements 100, can then be guided, during attachment of the electromagnetic brake 20 to another component, through the through holes 21e and the correspondingly positioned recesses 22b on the lugs 22a of the friction disk 22.

LIST OF REFERENCE SIGNS

1 Crane
2 Crane girder
3 End
4 End
5 Chassis
6 Chassis
7 Crane trolley
8 Control switch
9 Control unit
20 Electromagnetic brake
21 Housing body
21a Guide groove
21b Recess
21c Receiving groove
21d Receptacle
21e Through hole
21f Shoulder
21g Blind hole
21h Second opening
21i Casing wall
21k Base
21m First opening
22 Friction disk
22a Lug
22b Recess
22c Recess
22d Hole
23 Bayonet-type connection
25 Armature disk
25a Guide lug
25b Recess
25c Hole
26 Coil unit
26a Positioning lug
26b Shoulder
26c Hole
26d Upper limb
26e Web
26f Lower limb
27 Snap hook
28 Groove
28a Web
29 Brake disk
29a Sprocket
29b Brake pad
29c Hole
30 Compression spring
31 Pole core
32 Groove-lug connection
33 Central axis
34 Snap-fit connection
100 Locking element
h Lifting gear

F Direction of travel
x Longitudinal direction

The invention claimed is:

1. An electromagnetic brake comprising:
a housing body comprising a body web and an annular recess, wherein the annular recess is disposed about a central axis;
a coil unit disposed in the annular recess, wherein the coil unit comprises a coil web with an upper limb and a lower limb extending from the coil web and with the coil web extending in the direction of the central axis, and wherein the coil unit is positively connected to the housing body by a snap-fit connection via at least one snap hook that is disposed at the coil web and is flexible and engages with the body web of the housing body, and wherein the lower limb includes a shoulder distal from the coil web, and wherein the shoulder spaces the lower limb from a base of the housing body and the coil unit is bendable about the shoulder such that the coil unit is axially moveable in the annular recess.

2. The electromagnetic brake according to claim 1, wherein the coil unit is secured against rotation relative to the housing body.

3. The electromagnetic brake according to claim 1, wherein the coil unit is mounted on the housing body such that the coil unit in the region of the positive connection to the housing body is axially movable relative thereto to simplify assembly.

4. The electromagnetic brake according to claim 1, further comprising an armature disk that is guided axially via a groove-lug connection in the housing body, wherein at least one guide groove and at least one associated guide lug are provided.

5. The electromagnetic brake according to claim 1, further comprising a friction disk that is positively connected to the housing body.

6. The electromagnetic brake according to claim 1, wherein the coil unit comprises at least one positioning lug configured to engage in a corresponding receptacle of the housing body to prevent rotation.

7. A lifting gear comprising the electromagnetic brake according to claim 1.

8. A method for assembling the electromagnetic brake according to claim 1, comprising inserting the coil unit into the housing body such that at least one positioning lug of the coil unit engages in a corresponding receptacle of the housing body as an anti-rotation means and/or snap-fit connecting the coil unit to the housing body by an axially positive connection with the at least one snap hook of the coil unit supported on the web of the housing body, wherein said method further comprises axially moving the coil unit in the annular recess by bending the coil unit about the shoulder while inserting the coil unit into the housing body.

9. The method for assembling the electromagnetic brake according to claim 8, further comprising inserting an armature disk of the electromagnetic brake into the housing body such that at least one guide lug of the armature disk is guided in an associated guide groove of the housing body.

10. The method for assembling the electromagnetic brake according to claim 8, further comprising inserting a friction disk into at least one recess of the housing body and bringing the friction disk into engagement with the housing body via a receiving groove adjoined to the at least one recess by a relative movement in the direction of rotation, wherein at least one lug of the friction disk and the at least one recess are no longer axially aligned after the relative movement.

11. The method for assembling the electromagnetic brake according to claim 10, wherein the at least one lug of the friction disk comprises three lugs and wherein the at least one recess of the housing body comprises three recesses.

12. The electromagnetic brake according to claim 4, wherein the respective guide groove is arranged in the housing body.

13. The electromagnetic brake according to claim 4, wherein the at least one guide groove comprises three guide grooves and the at least one associated guide lug comprises three guide lugs.

14. The electromagnetic brake according to claim 13, wherein the guide grooves are arranged in the housing body.

15. The electromagnetic brake according to claim 5, wherein the friction disk is secured against rotation relative to the housing body by at least one connecting element, and wherein the at least one connecting element comprises a shaft, and wherein an end of the shaft extends out from the housing body, and wherein the end of the shaft extending out from the housing body is threaded and is configured for attaching the electromagnetic brake to a component.

16. The electromagnetic brake according to claim 15, wherein the at least one connecting element comprises a plurality of screws.

17. The electromagnetic brake according to claim 1, wherein the housing body includes a groove at the annular recess, and wherein the at least one snap hook is configured to engage with the body web at the groove.

18. The electromagnetic brake according to claim 1, wherein the at least one snap hook engages with the body web proximate the upper limb.

19. The electromagnetic brake according to claim 1, wherein the housing body further comprises a pole core and a casing wall, and wherein the annular recess is disposed between the pole core and the casing wall.

* * * * *